United States Patent
Stiegler et al.

(10) Patent No.: US 6,782,552 B1
(45) Date of Patent: Aug. 24, 2004

(54) LOCAL RING NETWORK AND METHOD FOR TRANSMITTING DIGITAL DATA IN A LOCAL RING NETWORK

(75) Inventors: Andreas Stiegler, Ettlingen (DE); Michael Becker, Philippsburg (DE); Harald Schoepp, Ettlingen (DE); Jochen Klaus-Wagenbrenner, Oberweier (DE); Joachim Wietzke, Karlsruhe (DE)

(73) Assignee: Becker GmbH, Karlsbad (DE)

( * ) Notice: Subject to any disclaimer, the term of this patent is extended or adjusted under 35 U.S.C. 154(b) by 0 days.

(21) Appl. No.: 09/513,614

(22) Filed: Feb. 25, 2000

(30) Foreign Application Priority Data

Feb. 25, 1999 (DE) .......................................... 199 08 082

(51) Int. Cl.[7] ................................................ H04N 7/18
(52) U.S. Cl. ........................................ 725/74; 370/909
(58) Field of Search ................................. 370/452, 460, 370/908, 909; 725/105, 118, 129, 74; 348/14.08; 398/58, 59, 66, 67; H04N 7/18, 7/173; H04J 14/00

(56) References Cited

U.S. PATENT DOCUMENTS

| | | |
|---|---|---|
| 5,953,019 A | 9/1999 | Shimakawa et al. |
| 6,016,321 A | 1/2000 | Hetzel et al. |
| 6,157,725 A | 12/2000 | Becker |

FOREIGN PATENT DOCUMENTS

| | | |
|---|---|---|
| DE | 195 03 212 C1 | 10/1996 |
| DE | 196 53 438 A1 | 10/1997 |
| EP | 0 725 522 A2 | 8/1996 |
| EP | 0 855 311 A2 | 7/1998 |

*Primary Examiner*—Vivek Srivastava
(74) *Attorney, Agent, or Firm*—Laurence A. Greenberg; Werner H. Stemer; Ralph E. Locher

(57) ABSTRACT

A control command, which has a command header sequence and a sequence of n parameters, is generated in a data source of a local network. The control command has a variable length defined by the data source. The control command is passed to the ring data line of the local network and is forwarded to a data sink. This data sink contains a control unit, a picture output unit, an interface and a memory, in which video data are stored. The video data can be read out and displayed on the picture output unit. The control command has n parameters of which the first m parameters are interpreted by the control unit. The number m is determined by the properties of the data sink and is independent of the properties of the data source. Using the m interpreted parameters, specific video data are read from the memory and are reproduced.

The invention relates to a local network having a plurality of subscribers, which are connected to one another through the use of an optical data line for transmitting audio, video data and/or control data. The subscribers, together with the optical data line, form a ring network.

13 Claims, 2 Drawing Sheets

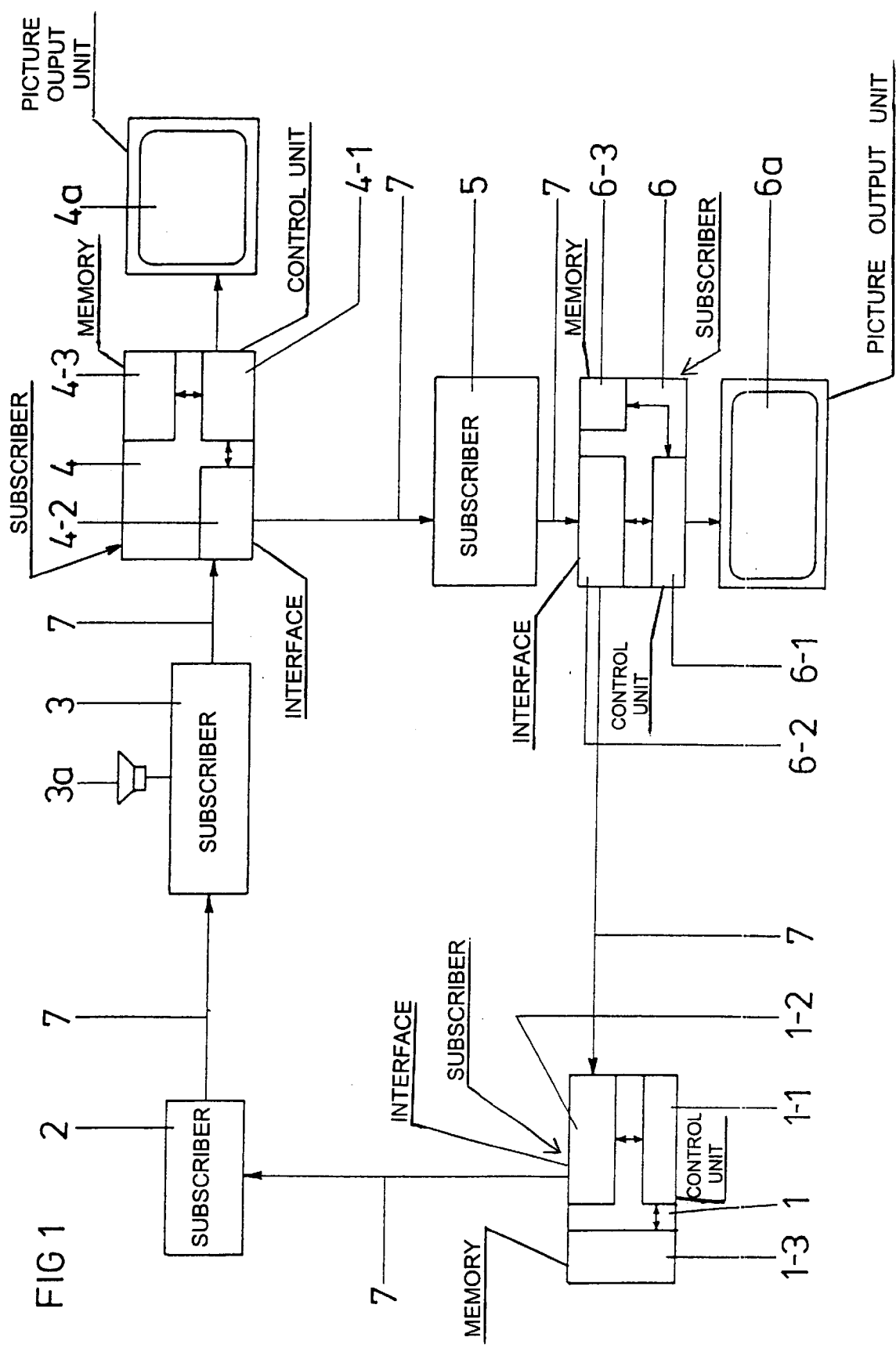

LOCAL RING NETWORK AND METHOD FOR TRANSMITTING DIGITAL DATA IN A LOCAL RING NETWORK

BACKGROUND OF THE INVENTION

Field of the Invention

The invention relates to a local network having a plurality of subscribers, which are connected to one another through the use of an optical data line for transmitting audio and/or video data and control data. The subscribers, together with the optical data line, form a ring network.

Published European Patent Application EP 0 725 522 A2 describes a local network of this type, which enables audio and/or video and control data to be transmitted in a ring network between data sources and data sinks. In this case, the video data, which may be variable picture data for moving pictures or else invariable data for still frames or graphics data, are transmitted as source data in a specific format in a corresponding source data area. Separately from the video data, the control commands are transmitted in another area correspondingly reserved for control data. In this case, by way of example, items of information concerning arbitration or, channel definition are provided as control commands. In addition, arbitrary, unformatted transparent data without any reference to the formatting of the control data and without any reference, regarding content, to the individual subscribers of the network can be transmitted into the area for which the transmission of control data is intended. The content of these data has no effect on the function of the individual subscribers. In particular, it is possible for these data not to form control data or control commands for individual subscribers of the network. In order to avoid repetition of information already described, reference is made, with regard to the description of the transmission format, in particular the synchronous data transmission in a continuous data stream, to the disclosure in Published European Patent Application EP 0 725 522 A2, which forms a basis for the present invention.

This local network has control commands having a rigid, a fixedly formulated command structure. In this case, a specific control command has a defined structure and hence a defined command header sequence followed by an invariable number of parameters. The data source passes the control command via its interface to the ring data line, which forwards the control command with the associated parameters to the assigned data sink, which, with knowledge of the invariable structure of the control command, initiates specific sequences of events on the basis of the control command. This sequence of events makes it possible to integrate into the local network only data sinks which know and can process the complete set of commands of the data sources, including their structure. As a result, it is not possible for the data sinks to be configured independently of the data sources, which substantially restricts the flexibility of the local network in particular with regard to an update.

SUMMARY OF THE INVENTION

It is accordingly an object of the invention to provide a local network having a plurality of subscribers which overcomes the above-mentioned disadvantages of the heretofore-known networks of this general type and which exhibits an increased flexibility. It is furthermore an object of the invention to provide a method for transmitting digital data in a local ring network which has a high degree of flexibility.

With the foregoing and other objects in view there is provided, in accordance with the invention, a local network, including:

an optical data line;

a plurality of subscribers connected to one another by the optical data line for forming a ring network and for transmitting control data and at least one of audio data and video data;

at least one of the subscribers constituting a data source for at least one of the audio data, video data and control data and at least another one of the subscribers constituting a data sink for at least one of the audio data, video data and control data;

the data source having a data source-control unit and a data source interface to the optical data line, the data source being configured for passing a control command, via the data source interface, to the optical data line, the control command having a length defined by the data source, having a command header sequence and having a sequence of n parameters, n being a first given number;

the data sink having a data sink control unit, a picture output unit, a data sink interface and a memory for holding and for outputting video data via the picture output unit, the data sink control unit controlling the outputting of the video data;

the data sink control unit receiving the control command, via the data sink interface, and interpreting the control command by interpreting m initial ones of the n parameters, m being a second given number; and the data sink control unit reading video data corresponding to the m initial ones of the n parameters from the memory of the data sink and outputting the video data, corresponding to the m initial ones of the n parameters, on the picture output unit.

With the objects of the invention in view there is also provided, a method for transmitting digital data in a local ring network, the method includes the steps of:

providing a local ring network having a data source, a data sink and a ring data line;

generating, in the data source, a control command having a command header sequence and a sequence of n parameters, n being a first given number, the control command having a variable length defined by the data source;

passing the control command, via a data source interface, to the ring data line;

providing the data sink with a data sink control unit for controlling the data sink, a picture output unit, a data sink interface and a memory for holding video data to be output via the picture output unit under a control of the data sink control unit;

feeding the control command, via the data sink interface to the data sink;

interpreting, with the data sink, the control command by interpreting m initial ones of the sequence of n parameters, m being a second given number;

reading video data corresponding to the m initial ones of the n parameters from the memory of the data sink; and outputting the video data corresponding to the m initial ones of the n parameters on the picture output unit.

In other words, the invention provides a local network having a data source which has a control unit and an interface to the ring data line and which generates a control command having a length defined solely by the data source itself and passes the control command via the interface to the ring data line. The length of the control command is produced or results from the command header sequence and an adjoining sequence of parameters whose number n is defined by the data source itself. On account of the dependence on the respective data source, the number of parameters n can be given different values for different data sources, with the result that the length of the control command is defined differently depending on the properties of the data source. Once the control command has been passed via the interface of the data source to the ring data line, the control command is read by a data sink defined by the command header sequence. In this case, the control command is fed to a control unit via the interface. In the control unit, the control command having a length defined by the data source is interpreted by evaluating a defined number of parameters m. The number of parameters m to be evaluated by the data sink is determined by the properties of the data sink and is thus independent of the data source for the control command. The first m parameters from the sequence of the n parameters of the control command are interpreted. Video data corresponding to the m parameters are read in a targeted fashion from a memory of the data sink by the control unit and fed to the picture output unit for outputting. In this case, the picture output unit may be part of the data sink, or be connected to the latter. The video data may in this case be read from the memory and output either as invariable graphics data, as still frames or as a sequence of pictures. By releasing the data source and the data sink from a fixedly formulated, invariable command format for the control commands with an invariable number of parameters it is possible to substantially increase the flexibility of the local network. As a result, it becomes possible, in particular, for individual data sinks to be exchanged independently of the data source or for such data sinks to be additionally added. Furthermore, it is also possible, with a single control command with n parameters, to address different data sinks and to display different graphics, still frames or video sequences in their picture output units depending on the properties of the data sink, that is to say depending on the number of respectively evaluated parameters (m1, m2, . . . ) that have been interpreted.

In addition, however, it is also possible to replace one or more data sources of the local network by others or to add new ones without necessitating corresponding adaptation in the data sinks. By way of example, it is possible to add a data source which can provide a larger number of parameters (n) for a specific control command, without this resulting in a change in the data sinks. If the data sinks are unable to evaluate these additional parameters, then the displayed video data in the relevant picture output units do not change. On the other hand, the displayed picture does change if additional parameters can be interpreted by the data sink and data contents associated with these additional parameters can be taken from the memory and can be output on the picture output unit in addition to the previously displayed picture information.

The parameters of the control command represent specific picture contents which are jointly output in the picture output unit of the relevant data sink. If the data sink is able to interpret a multiplicity of parameters m and to retrieve the corresponding items of picture information from the memory, then a highly detailed picture is produced on the picture output unit. On the other hand, the picture that is output turns out to have very little in the way of detail if the number m of evaluated parameters in the data sink is very small.

It has turned out to be particularly advantageous to organize the parameters in the control command hierarchically. This hierarchical ordering ensures that the first parameter represents a picture content of general, not very specific, not very detailed contents, while each subsequent parameter in each case represents an even more specific, more detailed picture content. This hierarchical structuring with a more detailed, more specific picture content that increases continuously with the number of evaluated parameters ensures that when the first m parameters are evaluated, the most general information concerning the picture content is always concomitantly taken into account, and the correspondingly least detailed, most general picture contents are likewise taken into account.

Accordingly, the effect achieved is that in the case of a data sink of simple configuration, which can only present a small picture content, this being governed by the resolution, the number of colors to be reproduced or the like, the fundamental information with the most general content is always presented, corresponding to the low number m for the parameters to be evaluated, while in the case of an elaborate, complex, high-performance data sink which can evaluate and present a high number m of parameters, a more diverse and more detailed and more specific overall picture is reproduced. In this case, information from the memory with respect to the different parameters 1 to m is reproduced together. Due to the hierarchical structure, it is possible, in a simple manner, to always evaluate the first parameters representing the most general picture information. This structuring allows the evaluation in the data sink in a very simple, rapid and reliable manner.

If the data sink is able to interpret or evaluate as many or more parameters than parameters (n) transmitted from the data source, then the data sink will preferably interpret the n parameters, take the corresponding picture contents from the memory and output them together. If, on account of its property, the data sink is able to evaluate only m parameters of a larger number of n parameters made available by the data source, then only these first m parameters are evaluated and the corresponding picture information is displayed via the picture output unit. The further parameters which are part of the control command after the m-th parameter are not evaluated by this data source which can only interpret m parameters and, accordingly, are also not represented by a corresponding picture content in the event of outputting on the picture output unit. This configuration of the data sink makes it possible to free the control unit of unnecessary burdens, since only those parameters which are relevant to this data sink with its specific properties and thus defined value m are interpreted.

It has turned out to be highly advantageous to transfer or put the data sink according to the invention into a storage operating state in which video data fed in via the interface are written to the memory of the data sink and these video data can be output in the normal operating state through the use of the control unit on the basis of a corresponding control command with corresponding parameters. This storage operating state makes it possible to update the displays on the picture output unit of the data sink via the network, without the data sink having to be exchanged. Adaptation of the picture outputs in the event of altered or new boundary conditions is thus possible in a simple and flexible manner.

Preferably, the control unit determines not only the content of the pictures to be displayed by reading the relevant picture contents from the memory of the data sink on the basis of the evaluated m parameters of the control command, rather it also determines, moreover, the properties of the picture reproduction of the picture output unit; in particular the picture properties such as contrast, color, picture brightness, viewing angle, viewing window, excerpt or the like. In this case, the control unit of the data sink receives the relevant control data via the ring data line within the control command having the variable length defined by the properties of the data source. By virtue of this related transmission of the parameters together with the control data with respect to the picture properties, it is possible to ensure, in a highly efficient manner, the control of the picture reproduction with very low utilization of the transmission capacity of the network.

Moreover, it has turned out to be highly advantageous to transmit, in addition to the parameters and the command header sequence, the number of the subsequent parameters (n) as a result of which the evaluation of the control command is substantially simplified. Particularly when a comparison is made between the number (m) of evaluatable parameters in the data sink and the n available parameters in the control command. Due to this transmission of the number of transmitted parameters it is possible to simplify the control since now the control command no longer has to be monitored for a specific control command end identifier, nor is the control command permitted to have only a maximum control command length. If, in this last case, control commands having a relatively short length (relatively small number of parameters) are intended to be transmitted, then, in this unfavorable form of organization, the unused parameter locations have to be filled with gap-filling signals e.g. 00, which have no (informational) content. This considerably restricts the transmission capacity of the local network and adversely affects the flexibility. By contrast, the proposed advantageous embodiment of the invention with the transmission of the number of the subsequent parameters (n) turns out to be extremely flexible and highly efficient in terms of the utilization of the transmission capacity, especially as control commands of virtually any desired length are possible with the method of transmitting data according to the invention.

Other features which are considered as characteristic for the invention are set forth in the appended claims.

Although the invention is illustrated and described herein as embodied in a local network and a corresponding method of transmitting data in a local network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a block diagram of the structure of a local ring network according to the invention;

DESCRIPTION OF THE PREFERRED EMBODIMENTS

Figure 3:
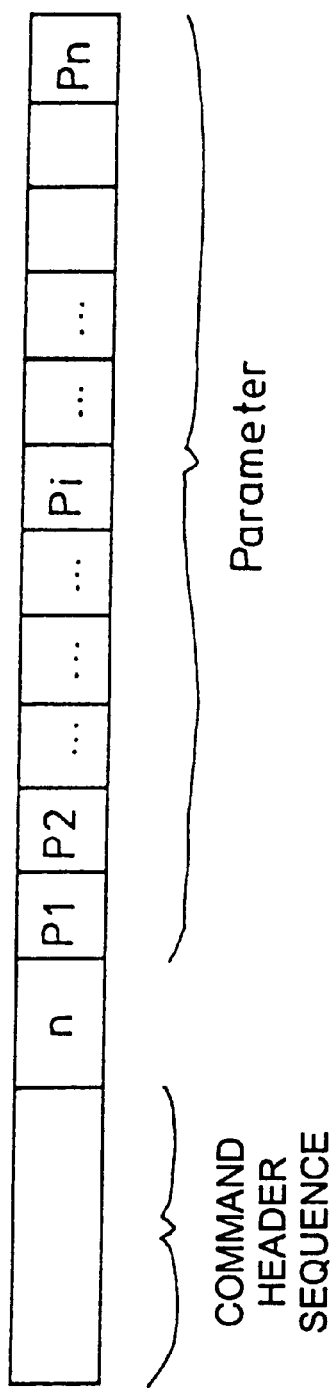
FIG. 3 is schematic illustration of the structure of a control command according to the invention.

Referring now to the figures of the drawings in detail and first, particularly, to FIG. 1 thereof, there is shown a local network which is suited for a use in a spatially confined environment, in particular in an automobile. This local network shows the subscribers 1, 2, 3, 4, 5, 6, which are connected to one another via a ring data line 7. The subscribers may constitute either data sources or data sinks. The data transmitted via the data line 7 may constitute either audio data or video data or control data. The subscriber 1 constitutes a navigation unit, for example, which passes audio data from the internal memory 1-3 for a voice output for navigation purposes via its interface 1-2 to the data line 7. The audio data are output by an audio data output unit 3 having an assigned loudspeaker 3a. In this case, the audio signals are read from the internal drive 1-3 of the navigation unit 1 and made available to the interface 1-2 in order to be forwarded to the data line 7 which leads to the audio reproduction unit 3. In addition, however, control commands are also generated by the control unit 1-1 for controlling other subscribers of the local network and are passed, in a manner corresponding to the audio data, via the interface 1-2 of the navigation unit 1, which serves as a data source, to the data line 7. The control commands may be of an extremely diverse nature. By way of example, they may define the assignment of individual audio data to specific audio reproduction units or else determine other operating parameters.

In addition to the customary control command, however, control commands which exhibit a length defined according to the properties of the data source 1 can also be generated by the navigation unit 1. This length is governed by the structure with a command header sequence, an information item concerning the number of subsequent parameters and the subsequent hierarchically structured parameters. The structure is described in more detail below with reference to FIG. 3. In the ring network, this control command having a defined length which is not determined by the other subscribers 2, 3, 4, 5, 6 of the local network is successively fed to the individual subscribers and then forwarded to the subsequent subscriber until the navigation unit 1 has this control command fed back to it. This ensures that all the subscribers of the network have received this control command and, insofar as it is intended for them, have interpreted it, evaluated it and correspondingly executed it.

In the present example, the subscribers 4 and 6 are configured as data sinks which have had the control command fed to them, via their interface 4-2, 6-2, from their respective preceding subscriber 3, 5 in the ring network. The control unit 4-1, 6-1 has the control command having the n parameters fed to it. However, it does not, in principle, interpret all n parameters, but rather the first m parameters from the sequence of n parameters which are part of the control command. The parameters over and above the m-th parameter are not interpreted by the data sink 4, 6, or by the control unit 4-1, 6-1 thereof. The number of parameters, to be interpreted, of the individual data sinks 4, 6 depends individually on the properties thereof. The data sink 4 is only able to interpret three (m1) of the ten parameters transmitted (n) by the data source 1 in the control command, while the data sink 6 is able to interpret seven (m2) parameters. In accordance with the 3 and 7 parameters respectively interpreted, respectively corresponding video data are taken from a memory 4-3, 6-3 of the data sink 4, 6 and fed via the control unit 4-1, 6-1 to the assigned picture output unit 4a, 6a. As a result of this, a distinctly less detailed overall picture with the picture contents corresponding to the three interpreted parameters (m1) is displayed in the picture output unit 4a. By contrast., the picture displayed in the picture output unit 6a turns out to be significantly more detailed, because it shows the video data corresponding to the seven interpreted parameters (m2), which is why a more detailed, more specific overall picture is afforded on account of the increased number of interpreted parameters. In the memories 4-3, 6-3, individual video data, which may be individual graphics elements, still frames or video sequences, are assigned to the individual parameters. In this case, different video data may be assigned to an individual parameter in the individual memories 4-3, 6-3, as a result of which, despite a uniform control command, distinctly different overall pictures are output at the different picture output units 4a, 6a. These overall pictures thus differ not only in terms of the detail (due to the different number of interpreted parameters), but also, if appropriate, in terms of the individual picture contents for an individual parameter.

The control command additionally contains in its command header sequence a command sequence which is evaluated by the control unit 4-1, 6-1 of the data sink and accordingly defines the properties of the picture display in the picture output unit 4a, 6a assigned to the data sink 4, 6. In this case, the picture properties, in particular contrast, color, brightness, viewing angle, viewing window, excerpt and the like, are defined by the data source, or the control unit 1-1 thereof, through the use of the control command via the control unit 4-1, 6-1.

The memories 4-3, 6-3 are configured as read/write memories which are able to have video data written to them in a storage operating mode. In this storage operating mode, which is initiated by the navigation unit 1 for example, the video data that are to be newly stored are passed by the CD-ROM drive 2 onto the data line 7 and written to the memory 4-3 or 6-3, respectively, in a targeted fashion via the interface 4-2 or 6-2, respectively, and via the control unit 4-1 or 6-1, respectively. The newly written video data are thus available for an output for a subsequent display on the basis of a communicated control command with corresponding parameters.

Since the number of parameters m that can be interpreted by the data sink depends on the properties of the data sink, the pictures, which are reproduced with the assigned picture output unit 4a or 6a, respectively, can differ to a great extent.

Since the number of interpretable parameters m in the individual data sinks 4,6 is independent of the number of parameters (n) of the control command of the data source 1, the data sinks 4, 6 are decoupled from the data source 1, and the data sinks 4, 6 are also decoupled from one another. Each of these subscribers 1, 4, 6 defines, according to its individual properties, the number of parameters (n, m) of the control command which it feeds (n) into the network or which it interprets (m). This means that it is possible for individual subscribers to be controlled, or replaced, flexibly in very different ways, without the other subscribers having to be taken into consideration.

During interpretation, the first m parameters of the control command according to the invention are always interpreted, the value m depending on the properties of the respective data sink. If the value m is less than the concomitantly transmitted value n of the number of transmitted parameters, then, under the control of the control unit 4-1, 6-1, the first m parameters are interpreted and the corresponding video data from the memory 4-3, 6-3 are output via the picture output unit 4a, 6a. If, on the other hand, the value n is greater than or equal to the value m of the transmitted parameters, then the number of interpreted and evaluated parameters is set such that it is equal to the number n. As a result, all of the transmitted parameters are interpreted and no attempt is made to interpret further parameters that have not actually been transmitted. This results in highly efficient control of the outputting of the video data on the basis of the transmitted number of parameters.

A simplified example of such a control command having a hierarchical parameter structure with 4 parameters n could have the following structure: "command header sequence; 4; blue, filling station, two fuel pumps, one nozzle". A data sink which interprets all four parameters (m) and can output corresponding graphics or video data could output a blue filling station with two fuel pumps each exhibiting a nozzle on its picture output unit. By contrast, a different data sink, which can interpret only two parameters (m), could display a royal blue representation of a filling station symbol, since it is unable to interpret further parameters or output corresponding video data.

In this case, the representative picture content of the parameter "filling station" differs considerably in the two data sinks, where just the symbol "filling station" is reproduced in one data sink, and a three-dimensional picture of a filling station is reproduced in the case of the other data sink. This different interpretation of just the single control command is governed by the properties of the respective data sink and thus leads to different presentations of the control command initiated by the data source for the display of a picture.

Figure 2:
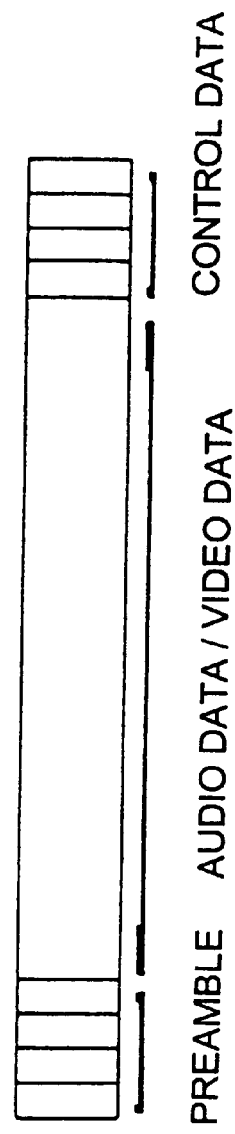
FIG. 2 is schematic illustration of the structure of a format in which the audio data and/or video data and the control data are transmitted.

FIG. 2 illustrates the structure of a frame for the continuous, synchronous transmission of source data (audio and/or video data) and control data. This structure is disclosed in Published European Patent Application EP 0 725 522 A2. The frame exhibits a preamble of four bits, which is used for the synchronization of the multiplicity of successive frames in a continuous data stream, followed by a contiguous area for the transmission of audio and/or video data, followed by a plurality of bit positions for the transmission of control data. In this case, a control command is written at a specific control bit position of the successive frames one after the other, as a result of which the control command extends over a multiplicity of successive frames. A structure of a control command according to the invention, which is written at a specific control bit position in accordance with FIG. 2, is illustrated in FIG. 3.

The control command has a command header sequence representing the type of control command. This is followed by an information item concerning the number of transmitted parameters (n). After that, the individual parameters (p1, p2, . . . , pn) then follow in a hierarchical structuring from general to detailed. In this case, the length, or the number of parameters n, is defined solely by the data source without reference to a data sink. The length differs depending on the properties of a data source, and thus may differ from data source to data source. The same applies correspondingly to the data sinks, which differ correspondingly in terms of the number of interpreted parameters (n).

We claim:

1. A local network, comprising:

an optical data line;

a plurality of subscribers connected to one another by said optical data line for forming a ring network and for transmitting at least one of control data, audio data, and video data;

at least one of said subscribers constituting a data source for at least one of the audio data, video data and control data and at least another one of said subscribers constituting a data sink for at least one of the audio data, video data and control data;

said data source having a data source control unit and a data source interface to said optical data line, said data source being configured for passing a control command, via said data source interface, to said optical data line, the control command having a length defined by said data source, having a command header sequence and having a sequence of n parameters, n being a first given number;

said data sink having a data sink control unit, a picture output unit, a data sink interface and a memory for holding and for outputting video data via said picture output unit, said data sink control unit controlling the outputting of the video data;

said data sink control unit receiving said control command, via said data sink interface, and interpreting the control command by interpreting m initial ones of the n parameters, m being a second given number; and said data sink control unit reading video data corresponding to the m initial ones of the n parameters from said memory of said data sink and outputting the video data, corresponding to the m initial ones of the n parameters, on said picture output unit.

2. The local network according to claim 1, wherein said data source passes the control command having the sequence of n parameters to said optical data line, such that the parameters are provided in a hierarchical order, each respective subsequent one of the parameters has a more specific and more detailed content than a respective previous one of the parameters.

3. The local network according to claim 1, wherein:

said data source passes the control command, which further includes an information item following the command header sequence and concerning the first given number n indicating the number of the parameters provided subsequent to the information item, via said data source interface, to said optical data line; and said data sink interprets the control command having the information item by comparing the first given number n with the second given number m number and, if n≧m, said data sink evaluates the m initial ones of the n parameters and initiates an output of the video data corresponding to the m initial ones of the n parameters, from said memory and, alternatively, if n<m, said data sink evaluates the n parameters and initiates an output of the video data, corresponding to the n parameters, from said memory.

4. The local network according to claim 1, wherein said data sink control unit, through the use of the control command received via said data sink interface, evaluates the m initial ones of the n parameters and outputs the video data, corresponding the m initial ones of the n parameters, from said memory and, in accordance with the control command, selects picture properties.

5. The local network according to claim 4, wherein said data sink control unit selects the picture properties including at least one of contrast, color, brightness, viewing angle, and viewing window.

6. A method for transmitting digital data in a local ring network, the method which comprises:

providing a local ring network having a data source, a data sink and a ring data line;

generating, in the data source, a control command having a command header sequence and a sequence of n parameters, n being a first given number, the control command having a variable length defined by the data source;

passing the control command, via a data source interface, to the ring data line;

providing the data sink with a data sink control unit for controlling the data sink, a picture output unit, a data sink interface and a memory for holding video data to be output via the picture output unit under a control of the data sink control unit;

feeding the control command, via the data sink interface to the data sink;

interpreting, with the data sink, the control command by interpreting m initial ones of the sequence of n parameters, m being a second given number;

reading video data corresponding to the m initial ones of the n parameters from the memory of the data sink; and outputting the video data corresponding to the m initial ones of the n parameters on the picture output unit.

7. The method for transmitting digital data in a local ring network according to claim 6, which comprises not interpreting any of the parameters of the control command after the m-th one of the n parameters.

8. The method for transmitting digital data in a local ring network according to claim 6, which comprises passing, with the data source, the control command having the sequence of n parameters to the ring data line, such that the parameters are provided in a hierarchical order, each respective subsequent one of the parameters has a more specific and more detailed content than a respective previous one of the parameters.

9. The method for transmitting digital data in a local ring network according to claim 6, which comprises:

passing, with the data source, the control command, which further includes an information item following the command header sequence and concerning the first given number indicating the number of the parameters provided subsequent to the information item, via the data source interface, to the ring data line; and interpreting, with the data sink, the control command having the information item by comparing, with the data sink, the first given number n with the second given number m number and, if n≧m, evaluating the m initial ones of the n parameters and initiating an output of the video data, corresponding to the m initial ones of the n parameters, from the memory and alternatively, if n<m, evaluating the n parameters and initiating an output of the video data, corresponding to the n parameters, from the memory.

10. The method for transmitting digital data in a local ring network according to claim 6, which comprises:

transferring the data sink into a storage operating state;

writing video data, fed in via the data sink interface, to the memory of the data sink during the storing operating state; and providing, with the data sink control unit, the video data written to the memory for an output during a normal operating state, in response to a specific control command.

11. The method for transmitting digital data in a local ring network according to claims 6, which comprises determining the number of the m initial ones of the sequence of n parameters to be interpreted, based on properties of the data sink and independently of the data source.

12. The method for transmitting digital data in a local ring network according to claim 6, which comprises controlling, with the data sink control unit, a picture output on the picture output unit in terms of picture properties and determining the controlling step with the control command fed in via the data sink interface.

13. The method for transmitting digital data in a local ring network according to claim 12, which comprises controlling the picture output on the picture output unit in terms of the picture properties including controlling at least one of contrast, color, brightness, viewing angle, and viewing window.

* * * * *